United States Patent Office 2,967,892
Patented Jan. 10, 1961

2,967,892

PRODUCTION OF ETHERS BY REACTION OF PHENOLS WITH 3-CHLORO-1,2-PROPYLENE CARBONATE

John S. Smith, Lake Jackson, Tex., assignor to The Dow Chemical Company, Midland, Mich., a corporation of Delaware No Drawing. Filed Nov. 12, 1959, Ser. No. 852,195

5 Claims. (Cl. 260—613)

The present invention relates to a novel process for the production of polyols and is more particularly concerned with a process for the production of glyceryl ethers having the general formula

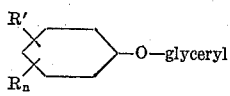

wherein $n$ is an integer from 0 to 4, inclusive, R represents a member selected from the group consisting of halogen, alkyl, and combinations thereof, R' represents a member of the group consisting of hydrogen, halogen, alkyl and the group

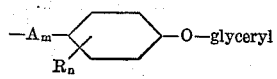

wherein, $m$ is an integer from 0 to 1, and A represents a divalent aliphatic hydrocarbon group containing from 1 to 4 carbon atoms, inclusive. The expression glyceryl as employed herein refers to the monovalent radical derived from glycerol having the formula

—CH$_2$—CHOH—CH$_2$OH

Prior art processes for the preparation of the polyols generally have employed expensive reactants such as glycerin monochlorohydrin, allyl phenyl ethers or glycidol. These processes also have had to employ long reaction periods and in some instances, expensive catalysts. The yields have been generally of a relatively low order resulting in an expensive and therefore practically commercially unavailable product.

It is therefore an object of the present invention to provide a process for the preparation of aryl glyceryl ethers which gives increased yields with shortened reaction periods. These and other objects of the present invention will become apparent from the following specification and claims.

It has now been found that aryl glyceryl ethers can be produced by the reaction of 3-chloro-1,2-propylene carbonate with a phenol or an alkylidene bisphenol or one of their halo and alkyl substituted homologues or analogues, in the presence of strong alkali. The reaction proceeds smoothly at temperatures from about room temperature to about the reflux temperature of the mixture and preferably between 30° C. and about 130° C. Conveniently the reaction may be carried out in the presence of an inert solvent such as benzene, toluene or xylene. The reaction may be carried out in the presence of water. During the reaction, the gaseous products are vented as formed. The reaction time is usually between about 0.5 and 5.0 hours depending on the temperature of the reaction mixture and the reactants employed.

In the preferred manner of carrying out the process of the present invention, a phenol or an alkylidenebisphenol or one of their substituted homologues or analogues and 3-chloro-1,2-propylene carbonate are mixed or otherwise blended together in the presence of an inert solvent such as benzene and in substantially equivalent proportions. To this mixture is added an equivalent proportion of an alkali metal hydroxide, preferably in several aliquot parts over about a one hour period. Thereafter, the mixture is refluxed for an additional period of time until the evolution of gas of reaction has substantially ceased. The reaction mixture is filtered, washed with water, and the filtrate fractionally distilled under reduced pressure to obtain the desired product.

The following examples are illustrative of the present invention but are not to be construed as limiting.

*Example 1.—3-phenoxy-1,2-propanediol*

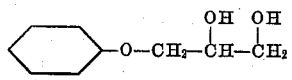

Phenol (94.0 grams; 1.0 mole), 136.5 grams (1.0 mole) of 1-chloro-2,3-propylene carbonate, 150 milliliters of benzene and 3 milliliters of water were mixed and blended together. Solid sodium hydroxide (10.2 grams; 0.26 mole) was added to the mixture with stirring and the resulting mixture heated at the reflux temperature for two and one-half hours. During this latter period, an additional 18.9 liters of gas were evolved. Upon completion of the reaction, the reaction mixture was filtered, washed with water, and the filtrate fractionally distilled to obtain 119 grams (70 percent yield) of 3-phenoxy-1,2-propanediol product as a fraction having a boiling range of 129°–142° C. at 0.6 millimeter pressure and a melting point of 50°–52° C.

*Example 2.—1,1'-isopropylidenebis(p-phenyleneoxy)-di-2,3-propanediol*

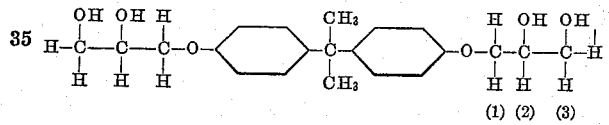

Isopropylidenediphenol (114 grams; 0.5 mole), 143.3 grams (1.05 mole) of 1-chloro-2,3-propylene carbonate and 200 milliliters of benzene were mixed and blended together. Solid sodium hydroxide (40.8 grams; 1.02 moles) was added in four aliquot portions to the mixture with stirring and heating at the reflux temperature over a 1 hour period at one half hour, twenty and ten minute intervals, respectively. The reaction mixture was heated at the reflux temperature for two and one-half hours. During the heating a total of 22.3 liters (S.T.P.) of gas were evolved. Upon completion of the reaction, as evidenced by the substantial cessation of evolution of gas of reaction, the reaction mixture was treated with 500 milliliters of dioxane and then filtered, washed with water, and the filtrate fractionally distilled to obtain 193 grams (106 percent yield) of a 1,1'-isopropylidenebis(p-phenyleneoxy)di-2,3-propanediol product as a residue at a final pot temperature of 150° C. at 30 millimeters pressure. The product was analyzed for OH:

Calculated for $C_{21}H_{28}O_6$—OH 18.08 percent. Found—OH 18.5 percent.

In a manner similar to the foregoing examples, other aryl glyceryl ethers may be prepared as follows:

1,1'-(p-phenylenedioxy)bis(2,3 - propanediol) by employing hydroquinone and 3-chloro-1,2-propylene dicarbonate.

1,1' - (m-phenylenedioxy)bis(2,3 - propanediol) by employing resorcinol and 3-chloro-1,2-propylene carbonate.

1,1' - (o-phenylenedioxy)bis(2,3 - propanediol) by employing catechol and 3-chloro-1,2-propylenecarbonate.

1,1'-sec. butylidenebis(p-phenyleneoxy)di-2,3 - propane diol by employing sec. butylidenebisphenol and 3-chloro-1,2-propylenecarbonate.

1,1'-trimethylenebis(p-phenyleneoxy)di-2,3-propanediol by employing trimethylene diphenol and 1-chloro-2,3-propylene carbonate.

1,1'-isopropylenebis(2-methyl-p-phenyleneoxy)di-2,3-propanediol by employing isopropylidenebis(2-methyl-p-phenol) and 3-chloro-1,2-propylenecarbonate.

Alkalies which may be employed in accordance with the invention are, for example, NaOH and KOH.

Other phenols which may be employed are, for example, the polyhalophenols and polyhalo bis phenols such as, 4-halo; 2,4-dihalo; 2,4,6-trihalo; 2,4,5,6-tetrahalo; and 2,3,4,5,6-pentahalophenols and the polyhalo alkyl phenol and bis phenol such as 4-halo-2-methyl phenol, 4,6-dihalo-2-methyl phenols, bis(4-halo-2-methyl phenol) and the like. Thus one can employ the 4-; 2,4,5-di; 2,4,6-tri-; 2,4,5,6-tetra-; 2,3,4,5,6-pentachlorophenols, diphenols, and bisphenols, 4-chloro-2-methylphenol, 4,6-dichloro-2-methylphenols, bis 4-chloro-2-methylphenol or the corresponding bromo and fluoro compounds.

This application is a continuation-in-part of my co-pending application Serial No. 698,330, filed November 5, 1957, and now abandoned.

I claim:

1. A method for preparing glyceryl ethers having the formula

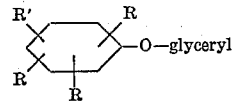

wherein each R represents an independently selected member from the group consisting of hydrogen, halogen and alkyl having from 1 to 4 carbon atoms, R' represents a member of the group consisting of hydrogen, halogen, alkyl, having from 1 to 4 carbon atoms, and the group

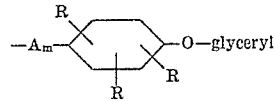

wherein $m$ is an integer from 0 to 1, R has the aforesaid significance, and A represents a divalent aliphatic hydrocarbon group containing from 1 to 4 carbon atoms inclusive, which comprises reacting the corresponding phenol with 3-chloro-1,2-propylene carbonate in the presence of a strong alkali.

2. The method of claim 1 wherein the alkali is sodium hydroxide.

3. A method for preparing 1,1'-isopropylidenebis-(p-phenyleneoxy) di-2,3-propanediol which comprises reacting isopropylidene diphenol with 3-chloro-1,2-propylene carbonate in substantially equivalent proportions and in the presence of sodium hydroxide.

4. The method of claim 1 wherein said reactants are reacted in substantially equivalent proportion.

5. A method for preparing 3-phenoxy-1,2-propanediol which comprises reacting phenol and 3-chloro-1,2-propylene carbonate in the presence of a strong alkali and in substantially equivalent proportions and at a temperature from 30° to 130° C.

No references cited.

UNITED STATES PATENT OFFICE
CERTIFICATE OF CORRECTION

Patent No. 2,967,892 January 10, 1961

John C. Smith

It is hereby certified that error appears in the above numbered patent requiring correction and that the said Letters Patent should read as corrected below.

In the grant, line 1, and in the heading to the printed specification, line 5, name of inventor, for "John S. Smith", each occurrence, read --- John C. Smith ---.

Signed and sealed this 12th day of September 1961.

(SEAL)
Attest:

ERNEST W. SWIDER
Attesting Officer

DAVID L. LADD
Commissioner of Patents
USCOMM-DC